June 2, 1936.  F. J. RATHBUN ET AL  2,042,962
COMBINED ELECTRIC MOTOR AND CONTROLLER
Filed July 21, 1933  3 Sheets-Sheet 1

Inventors:
Frank J. Rathbun,
Ralph T. Owen,
By: *[signature]*
Attorney.

June 2, 1936. F. J. RATHBUN ET AL 2,042,962
COMBINED ELECTRIC MOTOR AND CONTROLLER
Filed July 21, 1933 3 Sheets-Sheet 2

Inventors:
Frank J. Rathbun,
Ralph J. Owen,
By: Edwin B. H. Tower Jr.
Attorney.

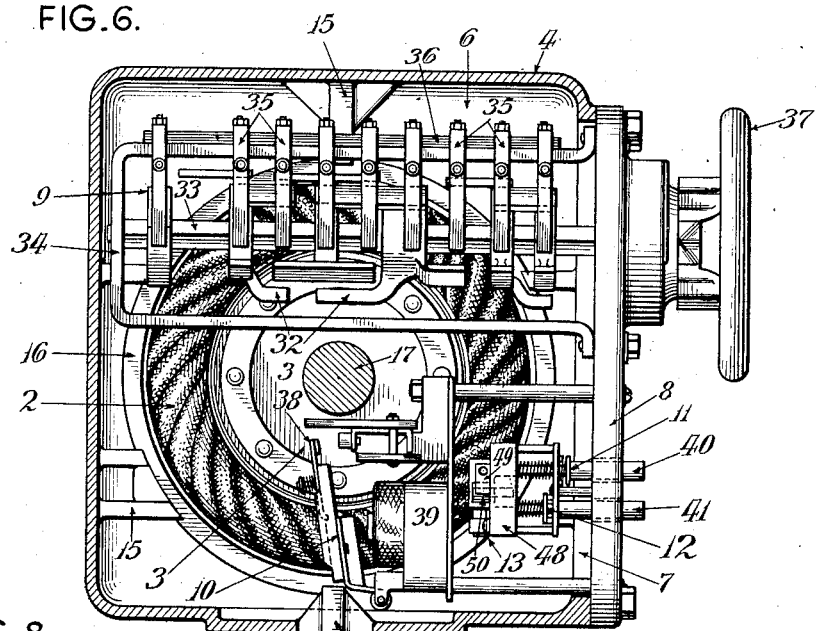
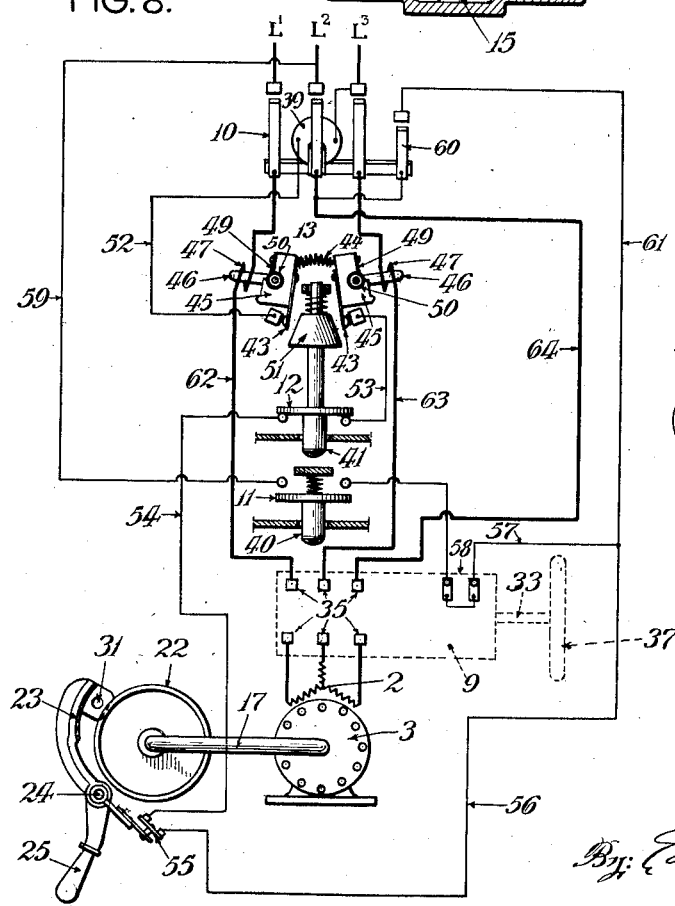
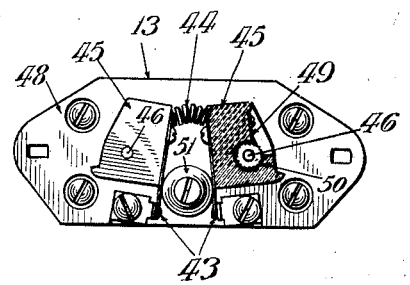

Patented June 2, 1936

2,042,962

UNITED STATES PATENT OFFICE 2,042,962

COMBINED ELECTRIC MOTOR AND CONTROLLER

Frank J. Rathbun and Ralph J. Owen, Milwaukee, Wis., assignors to The Louis Allis Company, Milwaukee, Wis., a corporation of Wisconsin Application July 21, 1933, Serial No. 681,450

4 Claims. (Cl. 172—36)

The invention relates to a combined electric motor and controller therefor of the type in which the motor and controller are enclosed and combined by a casing into a unitary appliance.

The combined motor and controller which is provided by this invention is devised primarily for a lathe or other machine tool on which the piece to be turned or worked is held or carried by a face plate or other appliance attached to the motor shaft.

The invention has as an object to provide a combined motor and controller in which both the motor and controller and the electrical connections between the same are enclosed within a unitary casing.

Another object is to provide a combined motor and controller with a unitary casing which will facilitate the heat being dissipated from the motor and which will thereby increase the capacity of a given sized motor.

Another object is to provide a combined motor and controller with a casing into which the controller may be readily placed and from which it may be readily removed.

Another object is to provide a combined motor and controller with a unitary controller which may be placed within the casing and removed therefrom as an individual entity.

Another object is to provide a combined motor and controller which are organized into a small and compact unitary appliance.

Another object is to provide a combined motor and controller in which the controller and its electrical connections to the motor are readily accessible.

Another object is to provide a combined motor and controller in which the controller has its operating handle arranged in an accessible and convenient position.

Another object is to provide a motor with a controller in which a main switch to start the motor is kept from being closed unless the motor brake is released.

Another object is to provide the motor with a lock to hold the motor shaft from being turned by screwing a face plate or other appliance thereon or unscrewing the same therefrom.

Another object is to provide the motor with a lock to keep the brake in a position to keep an interlocking switch from being closed until the lock is released.

Another object is to provide the motor with a lock which is kept from being actuated unless the brake is applied.

According to the invention as it is ordinarily embodied in practice, the combined electric motor and controller is provided with a unitary enclosing casing which contains the motor at one end and the controller at the other end and which has a lateral entrance thereto having a removable cover carrying the controller.

The combined motor and controller shown in the accompanying drawings and hereinafter described exemplifies and embodies the invention and the views in these drawings are as follows:

Fig. 6 is a transverse section taken on the line 6—6 of Fig. 1 showing the controller.

Fig. 7 is a detail view of an overload switch.

Fig. 8 is a diagram of the motor and controller and the electrical circuits thereof.

Motor and controller

Figure 1:
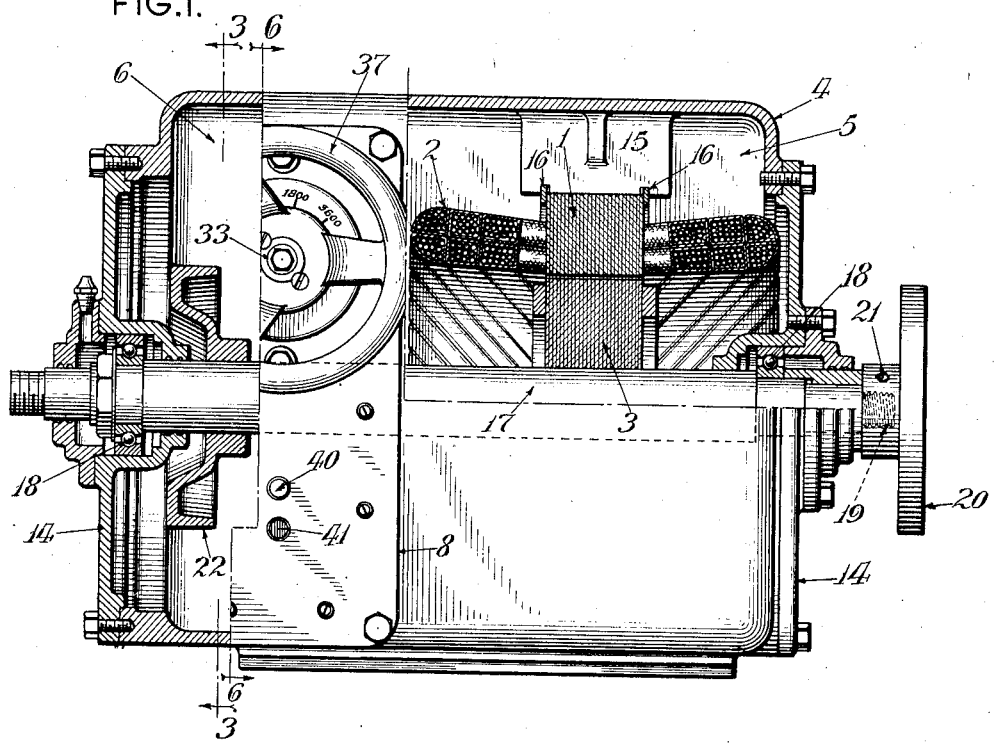
Fig. 1 is a side view of the combined motor and controller with a part thereof in section.
Figure 2:
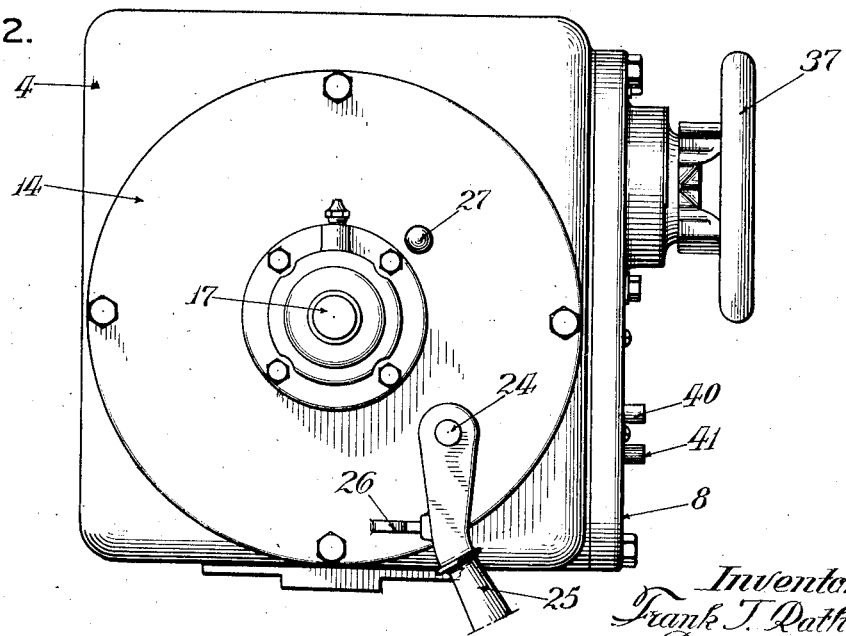
Fig. 2 is an end elevation of the controller and the casing.
Figure 3:
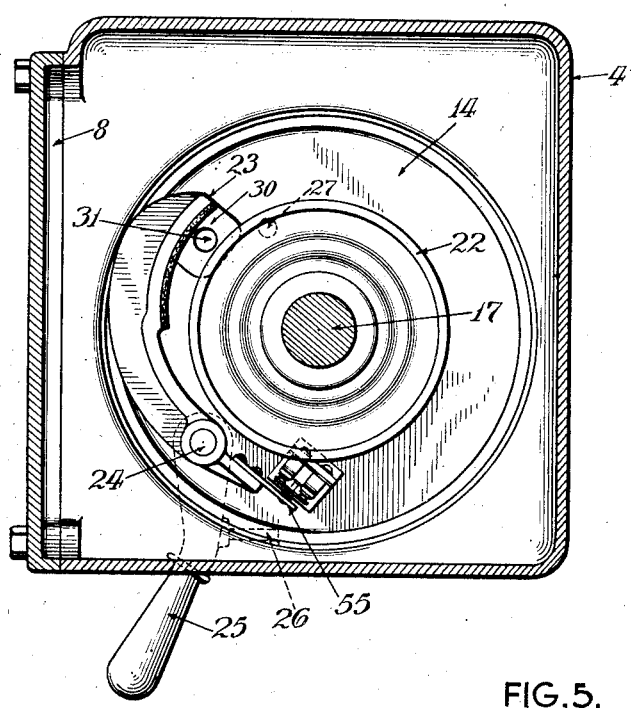
Fig. 3 is a transverse section taken on the line 3—3 of Fig. 1 with the brake released.
Figure 4:
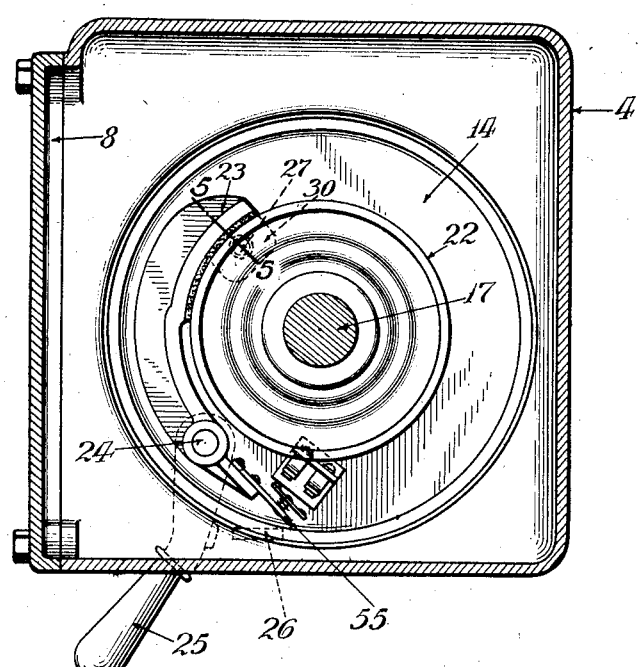
Fig. 4 is a view similar to Fig. 3 with the brake applied.
Figure 5:
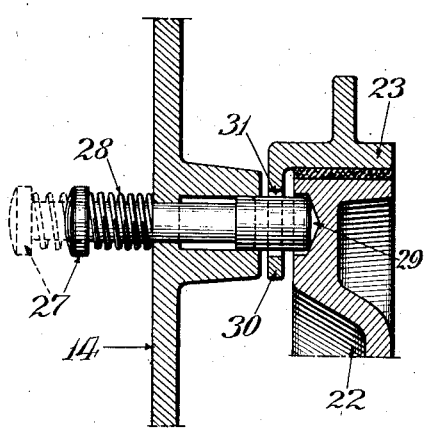
Fig. 5 is a section taken on the line 5—5 of Fig. 4 with the locking bolt in engagement with the brake drum.

The motor which is ordinarily employed is of the induction type but any other suitable motor may be employed.

The motor is provided with a stator having a laminated core 1 carrying a winding 2 for connection to a power circiut and with a rotor having a laminated core 3 carrying conductors connected in a closed circuit.

The motor and controller are provided with a unitary enclosing casing 4 which contains the motor in a compartment 5 at one end and the controller in a compartment 6 at the other end and which has a lateral entrance 7 thereto having a removable controller cover 8 carrying the controller.

The motor compartment and the controller compartment are open to each other to allow the air to circulate throughout the interior of the casing from end to end thereof.

The controller is provided with a drum switch 9 to control the stator winding, an electromagnetic main switch 10 to control the motor circuit, a starting switch 11 to close the main switch, a stopping switch 12 to open the main switch, and an overload switch 13 to open the main switch.

The controller switches are carried by the controller cover 8 and the drum switch is arranged above the motor shaft, and the main switch and overload switch are arranged below the motor shaft.

The controller has its electrical switches connected to each other and to the motor by electrical conductors arranged within the casing and having sufficient length to allow the controller to be removed from the casing.

The casing has upon each end thereof a removable end plate 14 to permit access to the interior thereof and facilitate assembling and disassembling the motor.

The stator core is supported within its compartment by radial lugs 15 upon the inside of the casing and it is retained in position upon these lugs between expansion rings 16 setting in notches in the lugs.

The rotor core is carried by a shaft 17 extending through each end plate and rotatable in a removable ball bearing 18 carried thereby.

The rotor shaft has a screw-threaded end 19 to attach thereto a face plate 20 or other appliance for carrying or holding the piece to be turned or worked.

The face plate has an aperture 21 in its hub to connect a wrench or other implement thereto to unscrew it from the shaft.

The motor has the heat absorbed from its stator core by the air in the casing circulating through the ventilating passage between the stator core and the casing, and then the heat is dissipated from the interior air through the casing to external air.

As the air within the casing circulates from end to end thereof and the casing has a large exterior surface to dissipate heat to external air, the stator core has its heat dissipated at a rapid rate and thereby the motor is enabled to operate at a high capacity.

*Motor brake*

The motor is provided with a brake for stopping it upon its circuit being opened by the controller.

The brake has a brake drum 22 fixed upon the motor shaft and a brake shoe 23 fixed upon a shaft 24 extending through the end plate and bearing therein.

The brake shoe is actuated to engage it with the brake drum by a handle 25 fixed to its shaft on the outside of the casing and bearing against a stop 26 on the end plate in its initial position.

The brake drum is engageable by a sliding locking bolt 27 to keep the motor shaft from being turned by screwing the face plate thereon or unscrewing it therefrom.

The locking bolt is carried by the end plate and retracted from the brake drum by a spring 28 and it engages the brake drum by being pressed into an aperture 29 therein.

The brake shoe has a flange 30 arranged to keep the locking bolt from engaging the brake drum until the brake is applied and having an aperture 31 to allow the locking bolt to pass therethrough into engagement with the brake drum after the brake is applied.

*Controller switches*

The drum switch 9 is provided with rotatable contacts 32 carried by a shaft 33 having one end bearing in the casing cover and the other end bearing in a bracket 34 attached to the casing cover and with stationary contacts 35 arranged to be engaged by the rotatable contacts and carried by an insulating base 36 upon the bracket.

The drum switch is operated by a hand wheel 37 attached to its shaft and arranged upon the outside of the cover.

The main switch 10 is provided with movable contacts 38 engageable with the stationary contacts and operated by an electromagnet 39.

The starting switch 11 is urged to its open position by a spring and it is actuated by a push-button 40 to close it.

The stopping switch 12 is urged to its closed position by a spring and it is actuated by a push-button 41 to open it.

The starting switch is connected in circuit to close the main switch to start the motor and the stopping switch is connected in circuit to open the main switch to stop the motor.

The overload switch 13 is of the type disclosed in United States Letters Patent No. 1,894,404, issued to C. W. Kuhn, January 17, 1933.

Such overload switch is provided with two pivoted contacts 43 engageable with stationary contacts and disengageable therefrom by a spring 44.

The pivoted contacts are each carried by an insulating block 45 pivoted upon a heat conducting spindle 46 having a heating coil 47 and carried by a supporting frame 48.

The pivoted contact is retained in engagement with its stationary contact by a latch having a pawl 49 arranged upon the insulating block and engaging a ratchet wheel 50 carried by the spindle.

The ratchet wheel is retained from rotation upon its spindle by being united thereto by a fusible binder.

When the heating coil 47 is subjected to an excessive current, sufficient heat is transmitted therefrom by the heat conducting spindle 46 to fuse the fusible binder. The ratchet wheel 50 is then released to allow the insulating block 45 to be turned by the spring 44 to disengage the movable contacts 43 from their corresponding stationary contacts.

When the excessive current subsides, the fusible binder again becomes solidified to reunite the ratchet wheel to its spindle and retain it from rotation thereon.

The overload switch has its contacts connected in the control circuit of the main switch and its heating coil connected in the motor circuit to respond to an abnormal or excessive current therein.

When the overload switch has responded to open the main switch, it may again be reset by actuating a cam 51 arranged upon a rod carried upon the inner end of the stopping push-button 41.

When the cam is moved inward by the stopping push-button, it moves each pivoted contact of the overload switch into engagement with its stationary contact and then the pivoted contact is retained in its closed position by its latch.

The controller by which the motor is controlled may be of different types and various switches and appliances may be employed therein.

*Controller operation*

The controller as illustrated by the diagram in Fig. 8 will now have its operation described.

The motor is operated by current supplied from a multiphase alternating current source through power lines $L_1$, $L_2$, and $L_3$.

The main switch is closed to connect the motor to the power line by closing the starting switch 11 to connect the operating electromagnet of the main switch in circuit from line $L_3$ through electromagnet 39, conductor 52, overload switch 13, conductor 53, stopping switch 12, conductor 54, interlocking switch 55 on the brake shoe, conductors 56 and 57, interlocking switch 58 on the drum switch, starting switch 11 and conductor 59 to the line $L_2$.

The operating electromagnet of the main switch has its circuit maintained by an auxiliary contact 60 on the main switch after the starting switch 11 is opened.

The auxiliary contact connects the conductor 56 to the line $L_2$ through conductor 61, auxiliary contact 60, and main switch contact 38, instead of through the interlocking switch 58 on the drum controller and the starting switch 11.

The motor circuit is closed by the main switch through conductors 62, 63, and 64, and contacts on the drum switch to the stator winding 2.

After the main switch is closed, the drum switch is operated to connect the terminals of the stator winding to the power line in different relations to thereby increase the speed of the motor.

The overload switch has its heating coils 47 connected in the motor circuit to respond to an abnormal or excessive current therein.

The starting switch is unable to close the main switch to start the motor unless the brake is released to close its interlocking switch 55 and the drum switch is in its initial position to close its interlocking switch 58.

The motor is stopped by opening the stopping switch or by applying the brake and thereby opening the interlocking switch 55.

When the brake is applied or the locking bolt engages the brake drum, the motor cannot be started as the control circuit of the main switch is opened by the interlocking switch 55 on the brake shoe.

The invention which has been set forth and described herein is susceptible of various modifications and embodiments which will be within the scope of the hereinafter claims.

The invention which is set forth in the foregoing description is hereby defined and claimed as follows:

1. A combined motor and controller, comprising a unitary casing provided with a lateral entrance having a removable cover, a motor arranged within said casing and having its shaft bearing in the ends thereof, and a controller provided with a drum starting switch arranged within said casing above said motor shaft and carried by said cover and having its shaft transverse to said motor shaft and with an electromagnetic main switch arranged within said casing below said motor shaft and carried by said cover.

2. A combined motor and controller, comprising a unitary casing provided with a lateral entrance having a removable cover, a motor arranged within said casing and having its shaft bearing in the ends thereof, a controller provided with a drum starting switch arranged within said casing above said motor shaft and carried by said cover and having its shaft transverse to said motor shaft and with an electromagnetic main switch arranged within said casing below said motor shaft and carried by said cover, and a manual control switch carried by said cover and controlling said electromagnetic main switch and operatable from the outside of said cover.

3. A combined motor and controller, comprising a unitary casing forming a motor compartment at one end and a controller compartment at the other end in open communication with each other to allow free circulation of air between the same and having a lateral entrance to said controller compartment, a removable cover closing said entrance and attached to said casing, a motor arranged within said motor compartment and provided with a stator core carried by lugs upon the inside of said casing and spaced from said casing to provide an air passage over said core and with a rotor core carried by a shaft bearing in the ends of said casing, and a controller carried by said cover and arranged within said controller compartment.

4. A combined motor and controller, comprising a unitary casing forming a motor compartment at one end and a controller compartment at the other end in open communication with each other to allow free circulation of air between the same and having a lateral entrance to said controller compartment, a removable cover closing said entrance and attached to said casing, a motor arranged within said motor compartment and provided with a stator core carried by lugs upon the inside of said casing and spaced from said casing to provide an air passage over said core and with a rotor core carried by a shaft bearing in the ends of said casing, and a controller provided with a drum starting switch arranged within said casing and carried by said cover and having its shaft transverse to said motor shaft.

FRANK J. RATHBUN.
RALPH J. OWEN.